United States Patent

Price et al.

[15] 3,674,798
[45] July 4, 1972

[54] POLYFLUOROISOALKOXYALKYL PYRIDINIUM SALTS

[72] Inventors: Alson K. Price, Eggertsville; Bernard Sukornick, Williamsville, both of N.Y.

[73] Assignee: Allied Chemical Corporation, New York, N.Y.

[22] Filed: Dec. 15, 1969

[21] Appl. No.: 885,328

[52] U.S. Cl. ............... 260/297 R, 260/286 Q, 260/294.8 R, 260/564 E, 252/3, 8/116.2, 8/94.1, 117/135.5, 117/152
[51] Int. Cl. ........................................................ C07d 31/28
[58] Field of Search ..............................260/297 R, 294.8 R

[56] References Cited

UNITED STATES PATENTS 3,171,861   3/1965   Ahlbrecht..............................260/297

Primary Examiner—Alan L. Rotman
Attorney—Jay P. Friedenson

[57] ABSTRACT

Compounds of the formula

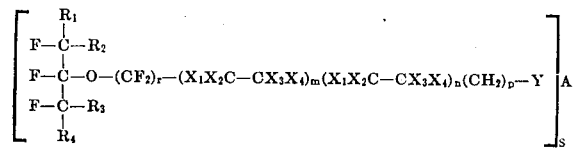

wherein $R_1$–$R_4$ are fluorine, chlorine or perhaloalkyl groups; $X_1$–$X_4$ are hydrogen, halogen, or alkyl halide; Y is thiourea, pyridine, quinoline, or the alkyl or hydroxyalkyl derivatives thereof; A is an accompanying anionic moiety; $r$ is an integer from 1-2, m and n are integers from 0-20, and $s$ is an integer from 1 up to the total negative charge of A. These compounds are useful as surface active agents and for imparting water and oil repellent properties to various substrates such as textiles, leather and paper.

22 Claims, No Drawings

POLYFLUOROISOALKOXYALKYL PYRIDINIUM SALTS

SUMMARY OF THE INVENTION

The compounds of the invention have the formula

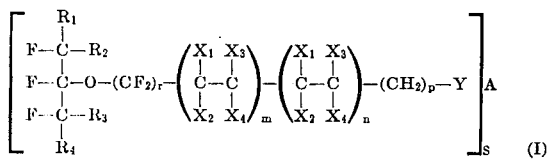

(I)

wherein a. $R_1-R_4$ can be independently selected from the group consisting of fluorine, chlorine and perhaloalkyl groups of one to 10 carbon atoms, or when taken together $R_1-R_4$ may form a perhalocycloalkyl structure, the halo portions of $R_1-R_4$ being fluorine or chlorine, with the provisos that each carbon atom of $R_1-R_4$ contain at least one fluorine atom, no more than three of $R_1-R_4$ are perhaloalkyl groups, $R_1$ and $R_2$ cannot both be chlorine and $R_3$ and $R_4$ cannot both be chlorine; preferably $R_1-R_4$ are fluorine or perfluoroalkyl groups of one to three carbon atoms.

b. $X_1-X_4$ independently can be hydrogen, fluorine, chlorine or bromine, provided that each $X_1-X_4$ group do not include more than two chlorine atoms or one bromine atom, and when $X_1$ and $X_3$ independently are each hydrogen or fluorine, each of $X_2$ and $X_4$ independently may be $CF_2R_5$ wherein $R_5$ is fluorine, chlorine, alkyl of one to eight carbon atoms, or haloalkyl of one to eight carbon atoms in which the halogen atoms are fluorine, chlorine or bromine, the $(X_1X_2C-CX_3X_4)_m$ and $(X_1X_2C-CX_3X_4)_n$ moieties may be the same or different; preferably $X_1-X_4$ are hydrogen, fluorine or chlorine.

c. Y is a nitrogen containing radical selected from the group consisting of thiourea and alkyl or hydroxyalkyl substituted thiourea connected through their S atom to the terminal C atom of the polyfluoroisoalkoxyalkyl radical, and pyridine, quinoline, alkyl or hydroxyalkyl substituted pyridine and alkyl or hydroxyalkyl substituted quinoline, connected through their N atoms to the terminal C atom of the polyfluoroisoalkoxyalkyl radical, preferably said alkyl substituents contain from one to three carbon atoms and the thiourea contains only a single alkyl or hydroxyalkyl substituent.

d. A is an accompanying anionic moiety, preferably A is a halide anion, a sulfate anion, a phosphate anion, an alkyl sulfonate anion of one to six carbon atoms, or an aryl sulfonate anion of six to nine carbon atoms, most preferably A is an iodide or bromide anion.

e. r is an integer from 1–2, m and n are integers from 0–20, the sum of m and n is 0–20, preferably m and n are 0–10, p is an integer from 0–1, with the proviso that when p is 0, n must be at least one and $X_3$ and $X_4$ in the $(X_1X_2C-CX_3X_4)_n$ moiety must be hydrogen, and s is an integer from 1 up to the total negative charge of A.

The criticality in the structure of the above described compounds is in the polyfluoroisoalkoxyalkyl tail portion of the molecule wherein an ether oxygen atom links a fluorinated carbon atom attached to two fluoroalkyl groups and at least one —$CF_2$— group.

It has been found that the novel compounds of this invention are useful as surface active agents in that they decrease the surface tension of aqueous solutions and of many organic solvents. The compounds can impart oil and water repellent properties to various substrates such as textiles, leather, paper and the like. They also find use as leveling agents in wax formulations, for forming stable water in hydrocarbon emulsions, and as surfactants for the protein foam class of fire fighting formulations.

DETAILED DESCRIPTION

The compounds of this invention wherein A in formula (I) is a halide or a sulfonate anion, may be prepared by reacting the corresponding polyfluoroisoalkoxyalkyl halide or sulfonate compounds of the formula:

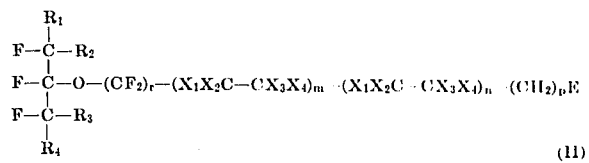

(II)

wherein E is a sulfonate anion or a halide anion, preferably E is an iodide or bromide anion, $R_1-R_4$, $X_1-X_4$, r, m, n and p have the meanings given above, with the appropriate nitrogen containing compounds, i.e., thiourea, pyridine, quinoline or the alkyl or hydroxyalkyl substituted derivatives thereof, in a suitable organic medium.

A polar organic solvent is the preferred organic medium. Generally when pyridinium or quinolinium derivatives are being prepared, excess pyridine or quinoline, respectively, may be used as the solvent. When thiourea is one of the reactants, ethanol is the preferred solvent. The solvent, of course, should not be so nucleophilic that it will interfere with the intended reaction. Thus, pyridine should not be used as a solvent when thiourea is a reactant.

A reaction temperature of about 45° C. to about 85° C. is preferred. Higher temperatures could probably be employed, but would most likely result in increasing the degree of olefin formation. At lower temperatures, the reaction would probably be too slow.

The ratio of polyfluoro starting material to nitrogen-containing compounds may be the stoichiometric ratio, however, use of excess nitrogen-containing compound is desirable since it favors a higher conversion of the more expensive polyfluoro reactant to the desired product. Generally, the mol ratio of nitrogen-containing compound to polyfluoro starting material ranges from 0.5:1 to 25:1, preferably from 1:1 to 5:1.

Illustrative of the above reaction are the following reactions in which p is defined as above and $R_f$ stands for the moiety:

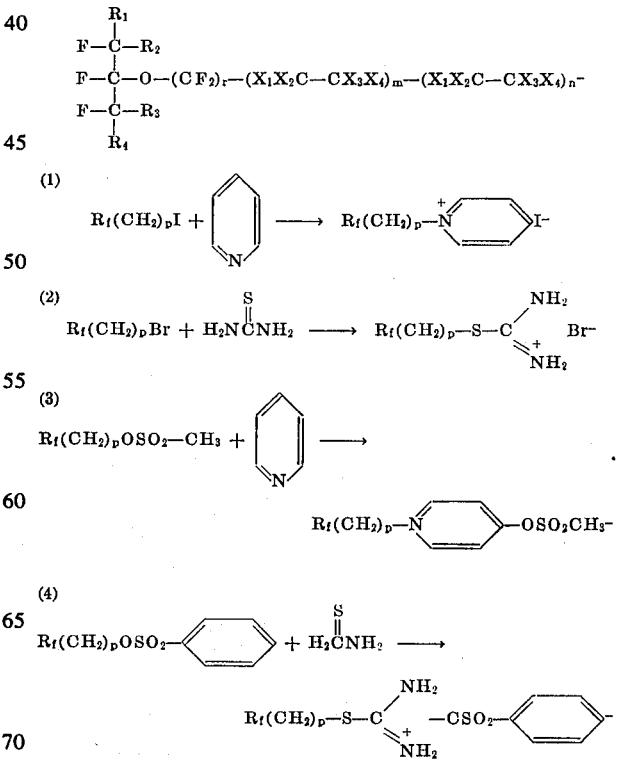

The compounds of this invention wherein A in formula (I) is a sulfate or a phosphate anion, may be prepared from the corresponding halides of this invention by use of conventional ion exchange techniques. Preferably the corresponding halides are the bromides or the iodides of this invention. Illustrative reactions are as follows, wherein $R_f$ is defined as above:

5)
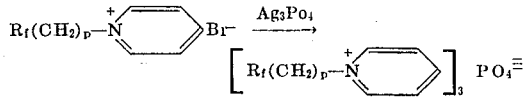

(6)
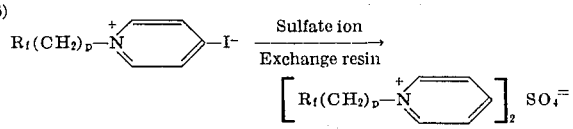

(7)
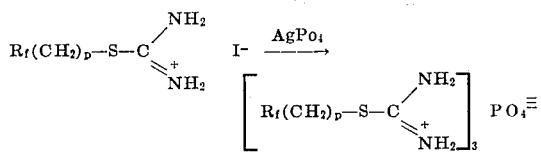

(8)
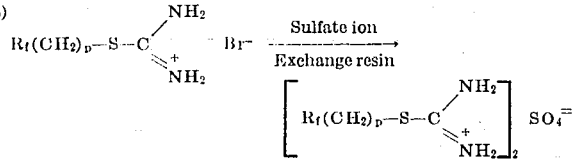

If for some particular applications other anions are desired, these may be substituted by well known anion exchange techniques. Thus, for example, acetate anions may be readily exchanged for halide anions.

The polyfluoroisoalkoxyalkyl sulfonate starting materials can be prepared by conventional means known to those skilled in the art. Essentially the sulfonates may be prepared by reacting the corresponding alcohols with an alkyl or aryl sulfonyl chloride in the presence of a base.

The corresponding alcohols can be prepared by the methods disclosed in copending U.S. application Ser. No. 721,089, filed Apr. 12, 1968, now abandoned, corresponding to French Pat. No. 1,580,225, issued Sept. 9, 1969. Essentially, the alcohol may be prepared from the corresponding telomers of the formula:

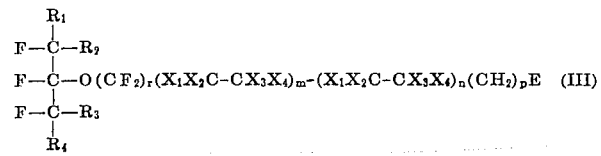

wherein $R_1$–$R_4$, $X_1$–$X_4$, $m$, $n$, $p$ and $r$ are as defined above and E is iodine or bromine, by reaction with $SO_3$ to form the corresponding polysulfates, followed by hydrolysis of the polysulfate with 35–50% $H_2SO_4$ at about 100° C. to the desired alcohol.

The polyfluoroisoalkoxyalkyl iodide and bromide starting materials used in the preparation of the above alcohols and in the preparation of the iodide and bromide compounds of this invention, and their method of preparation, are disclosed in copending application Ser. No. 633,359 filed Apr. 25, 1967 now U.S. Pat. No. 3,514,487, issued May 26, 1970, and in corresponding Belgian Pat. No. 714,162, the pertinent subject matter of said U.S. patent being hereby incorporated by reference. Essentially, these iodides, referred to as telomers in the above application and patent, may be prepared by telomerizing telogens of the formula:

wherein $R_1$, $R_2$, $R_3$ and $R_4$ are as indicated above. The reaction of the telogens of formula (IV) with a suitable telomerizable unsaturated material will give repeating units of the radial — $(X_1X_2C-CX_3X_4)$— in the molecule. For example,

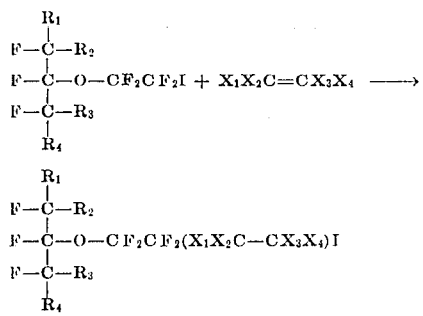

The longer chain iodide starting materials where $r$ equals one are telomers which may be prepared by the following procedure:

The polyfluoroisoalkoxyalkyl iodide telogen of formula (IV) is reacted with sulfur trioxide to form an acid halide. This reaction is carried out at temperatures between about 50°–175° C. Preferably, an excess of $SO_3$ is used and sufficient pressure is employed to maintain the reactants in liquid phase. The acid halide is hydrolyzed to the acid by refluxing in water. The resulting acid has a single carbon atom linking the oxygen atom with the carboxy group. This acid can then be converted to the corresponding telogen iodide possessing a single carbon atom linking the oxygen and iodine atoms by the well-known Hunsdiecker reaction which involves reacting the acid with alkali-free silver oxide ($Ag_2O$) to form the silver salt, followed by reaction of the silver salt with powdered iodine to form the iodide. This telogen iodide can then be telomerized with one or more olefins. Illustrative procedures are shown as follows:

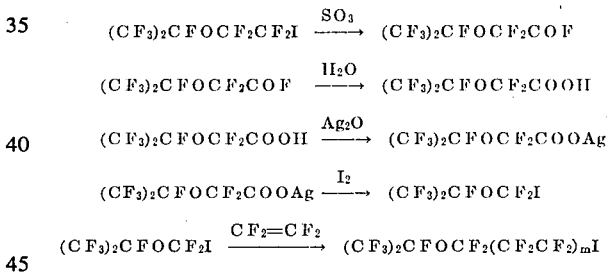
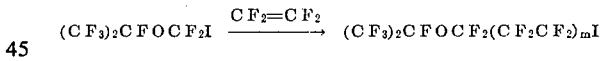

It should be noted that the above-noted telomerization reaction produces two products (A) and (B). The (A) product is obtained in about a 95% yield. The (B) product is obtained in about a 5% yield. The (A) and (B) products can be separated by conventional procedures. For example, dehydroiodinating the (A) and (B) product mixture with KOH at 75°–150° C. preferentially converts product (A) to the corresponding olefin which can then be readily separated from product (B) by distillation.

For the special case where $m$ and $n$ are 0 and $p$ and $r$ are 1, the iodide starting materials can be obtained by reacting a telogen of formula (IV) with $SO_3$, esterifying the resulting reaction products, reducing the ester to the alcohol with LiAlH$_4$ as reducing agent and reacting the alcohol with p-toluene sulfonyl chloride and metallic iodide to form the iodide containing one —$CF_2$— group and one —$CH_2$— group.

The telomerization reaction is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° and 350° C., preferably between about 150°–200° C. Furthermore, although the reaction may be conducted at atmospheric pressure, superatmospheric pressures, for example, up to about 20,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour to about 48 hours.

If desired, the telomerization reaction may be conducted by use of a catalyst or light of sufficient intensity to initiate the free radical reaction. Illustrative free radical generating catalysts include azonitriles such as alpha, alpha'-azobisisobutyronitrile and organic peroxides such as benzoyl perioxide, acetyl peroxide and pelargonyl peroxide. The use of such initiators allows operation at a lower temperature, but gives a somewhat more complex product mixture because of incorporation of catalyst fragments in the telomer mixture, or results in a higher molecular weight distribution in the telomer product.

The telomerization reaction may be carried out in various ways. For example, the telogen and the unsaturated compound may be introduced into an autoclave which is then sealed and heated, preferably with agitation such as by stirring or shaking until the pressure drop indicates that the reaction has proceeded to the desired extent. In such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound telogen molar ratio, the higher will be the average molecular weight of the telomer product. The ratio of telogen to unsaturated compound may vary from about 1:75 to as high as 200:1, the preferred ratio for batchwise operation being about 1:1 to 2:1 in the production of relatively low molecular weight telomers, i.e., telomers containing up to about 6 or 7 monomer units per telomer molecule. On the other hand, in a constant pressure reaction, i.e., where a constant pressure of unsaturated compound is maintained above the liquid phase comprising the telogen during the reaction, the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conventional separatory techniques, for example, by fractional distillation, fractional crystallization using an inert solvent such as diethyl ether, or the mixture of telomer products may be separated into fractions of narrower ranges of molecular weights having a desired viscosity or other properties.

The telogen starting materials may be prepared by reaction of an appropriate halogenated ketone with an ionizable fluoride salt to form a fluorinated organic salt and then reacting the organic salt with a halogen other than fluorine (e.g., iodine, bromine) and an appropriate olefin to form the desired telogen. This reaction is more fully described in copending applications of Litt et al., Ser. No. 492,276, filed Oct. 1, 1965 now U.S. Pat. No. 3,453,333, issued July 1, 1969 and Litt et al., Ser. No. 513,574, filed Dec. 13, 1965 now U.S. Pat. No. 3,470,256, issued Sept. 30, 1969, the pertinent subject matter of which is hereby incorporated by reference. For example, as is described in Examples 1 and 3 of the former application, the telogen perfluoroisopropoxyethyl iodide, $(CF_3)_2CFOCF_2CF_2I$, may be prepared by reacting hexafluoroacetone with potassium fluoride in an acetonitrile solvent to produce the corresponding addition compound having the formula $(CF_3)_2CF\ O^-K^+$ and thereafter reacting this addition compound with tetrafluoroethylene and iodine in the presence of an inert organic solvent to form the desired perfluoroisopropoxyethyl iodide, $(CF_3)_2CFOCF_2CF_2I$.

Telomers according to formula (III) wherein $n$ is 0 may be obtained by telomerizing a telogen of formula (IV) with a telomerizable unsaturated compound. The telomerizable unsaturated compound may be the same or different from that used as reactant with the fluorinated organic salt and halogen in preparation of the telogen starting materials. Telomers according to formula (III) wherein both $m$ and $n$ are 1 or over, may be obtained by reacting a suitable telogen with a first telomerizable unsaturated material to form a telomer and then reacting the telomer thus produced with a second telomerizable unsaturated material which may be the same or different as the first telomerizable unsaturated material. The telomerizable unsaturated compound may not contain bromine if the E atom in the telogen is bromine.

As can be seen from the above description, the telomers produced can serve as telogens for further reactions. The term telogen will be used in this sense herein. In other words, the telogen may be a telomer product produced from the telogen which telomer produced is further telomerizable.

Preferred telomerizable unsaturated materials are selected from the group consisting of $CF_2 = CF_2$, $CF_2 = CH_2$, $CF_2 = CClF$, $CF_3CF = CF_2$, and $CH_2 = CH_2$, which yield ($X_1X_2C-CX_3X_4$) moieties of the formula $-CF_2-CF_2-$, $-CF_2-CH_2-$, $-CF_2-CClF-$, $-CF_2CF(CF_3)-$ and $-CH_2-CH_2-$. Other suitable telomerizable unsaturated materials include the following: $CCl_2 = CH_2$, $CFH = CH_2$, $CClH = CH_2$, $CFH = CF_2$, $CFH = CFH$, $CClH = CClH$, $CF_2 = CFBr$, $CF_2ClCF = CH_2$, $CF_2CH = CF_2$, $CF_3CCl = CF_2$, $(CF_3)_2C = CF_2$, $CF_3CF = CFCl$, $CF_3CH = CFCl$, $CFCl = CFCl$, $CF_3CF= CF_2$, $CF_2ClCF = CF_2$, $CF_2BrCF = CF_2$, $CF_3CF = CFCF_3$, $CHF = CFCFCl_2$, $CHF = CFCF_3$, $CF_2 = CFCHClCH_3$, $CF_2 = CHCF_2CH_3$, $CF_2 = CHCF_2CH_2Cl$, $CH_2 = CCF_3CF_2Br$, $CF_2 = C(CF_3)CF_2(C_3H_7)$, $CHCl = CFCF_3$, $CH_2 = CClCF_2CH_3$.

Many more suitable telomerizable unsaturated compounds subject to the restrictions of the definition for the compounds of formula (I) given above, will readily occur to one of ordinary skill in the art.

DESCRIPTION OF THE PREFERRED EMBODIMENTS

A preferred class of compounds within the scope of the invention has the formula $$\left[\begin{array}{c} R_1 \\ | \\ F-C-R_2 \\ | \\ F-C-O-(CF_2)_v(CH_2)_wY \\ | \\ F-C-R_3 \\ | \\ R_4 \end{array}\right]_s A \qquad (V)$$

wherein $R_1$–$R_4$, Y, A and s are as defined above and $v$ and $w$ are integers from 1–20, preferably from 1–12. The preferred class of compounds may be prepared by one or more of the aforementioned methods of preparation.

The preferred nitrogen containing starting materials are pyridine, picoline, lutidine, 4-hydroxyethyl pyridine, quinoline and thiourea. Most preferred are pyridine and thiourea.

Illustrative of the most preferred class of compounds are the following:

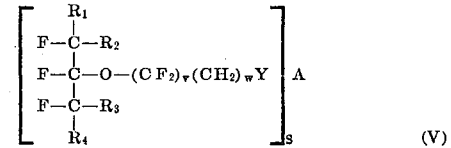

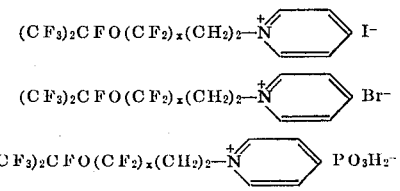

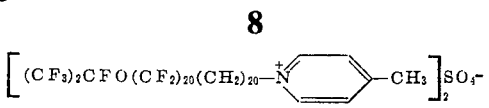

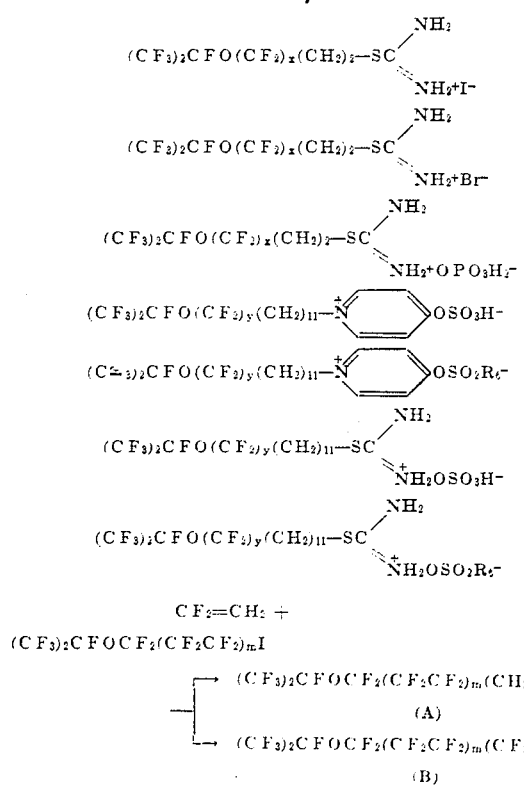

wherein $R_6$ is an alkyl or aryl, $x$ is 2, 4 or 6, and $y$ is 2 or 4.

Specific examples of embodiments of the novel compounds of the invention as defined by formulas (I) and (V) include the following:

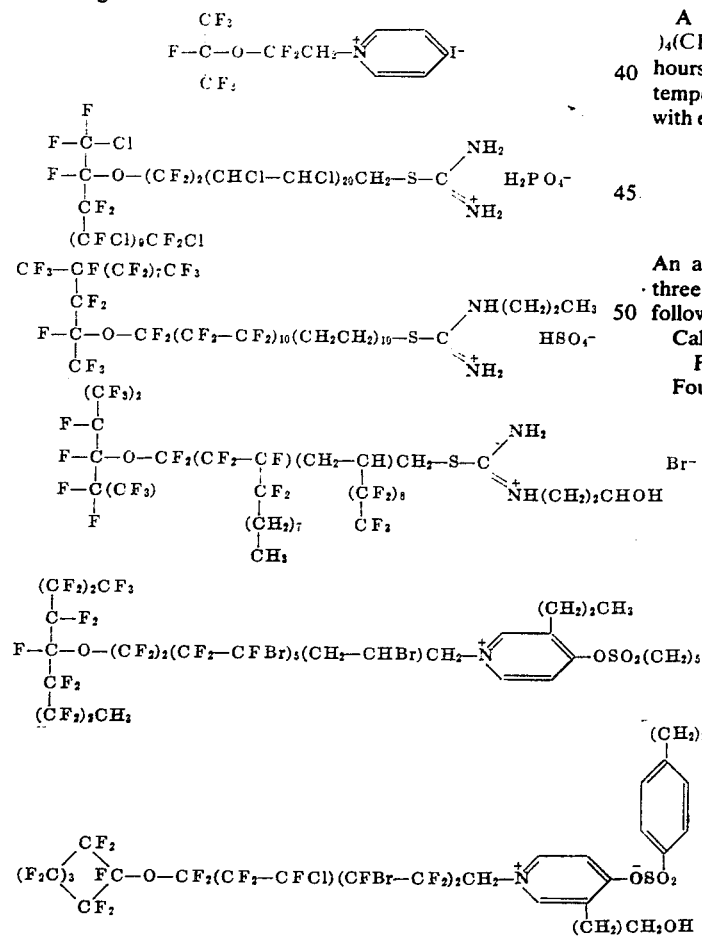

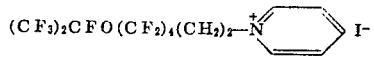

The invention can be more fully understood by reference to the following examples. Analyses are in percent by weight.

EXAMPLE 1

A mixture of 5.0 g. (0.0093 mole) of $(CF_3)_2CFO(CF_2)_4(CH_2)_2I$ and 25 ml. of pyridine was stirred and heated for hours at 50°–55° C. The mixture was then cooled to ambient temperature and filtered. The resulting solid was triturated with ether to provide 4.8 g. (85% conversion) of $(CF_3)_2CFO(CF_2)_4(CH_2)_2-\overset{+}{N}\diagup\!\!\diagdown\ I^-$ An analytical sample, m. p. 159.5°–161°, was obtained by three recrystallizations from ethyl acetate. Analysis gave the following results:

Calcd. for $C_{14}H_9NOIF_{15}$: C, 27.15; H, 1.46; N, 2.26; I, 20.49; F, 44.41

Found: C, 26.82; H, 1.51; N, 1.39; I, 21.13; F, 47.25.

The infrared spectrum exhibited aromatic absorption at 6.16 and 6.76 μ; C-F bands appeared as an envelope at about 7.5-9.0 μ. The spectrum thus further confirms the structure.

EXAMPLE 2

Following the general procedure described in Example 1, 26 g. (0.06 mole) of $(CF_3)_2CFO(CF_2)_2(CH_2)_2I$ was treated with pyridine to produce 27.4 g. of

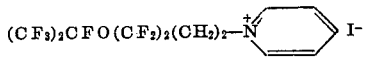

An analytical sample, m. p. 178.5°–180.5°, was obtained by one recrystallization from water followed by two recrystallizations from ethyl acetate. Analysis gave the following results:

Calcd. for $C_{12}H_9NOIF_{11}$: C, 27.76; H, 1.74; N, 2.67; I, 24.44; F, 40.25

Found: C, 27.63; H, 1.69; N, 2.52 I, 24.57; F, 40.40.

EXAMPLE 3

Seven grams (0.092 mole) of thiourea in 100 ml. of ethanol was added during a 15 min. period to a stirred solution of 26 g. (0.059 mole) of $(CF_3)_2CFO(CF_2)_2(CH_2)_2I$ in 25 ml. of ethanol at 25°. The reaction mixture was heated under gentle reflux for 18 hours. Evaporation of the ethanol left 33.1 g. of crude product, which was then recrystallized from water to give a quantitative yield of

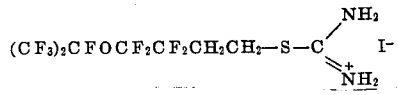

An analytical sample, m. p. 133°–134.5°, was obtained by four additional recrystallizations from water. Analysis gave the following results:

Anal. Calcd. for $C_8H_8N_2SOIF_{11}$: C, 18.61; H, 1.56; N, 5.42; S, 6.21; I, 24.58; F, 40.49

Found: C, 18.87; H, 1.61; N, 5.53; S, 6.54; I, 25.03; F, 41.58.

EXAMPLE 4

The surface tensions of aqueous solutions of the subject emulsifiers were measured at various concentrations with a DuNouy Tensiometer. The results are summarized in Table I.

EXAMPLE 5

Small pieces of 80 × 80 cotton print cloth (about 1–2 inches square) were dipped into aqueous solutions of the compound of Example 1 for approximately 30 minutes and then air dried for several hours. The treated specimens were tested for oil repellency. The procedure employed in determining the oil repellency ratings is described, for example, on pages 323–4 of the April, 1962 edition of the "Textile Research Journal". This procedure involves gently placing on the treated fabric drops of mixtures of mineral oil and n-heptane in varying proportions. The drops are allowed to stand on the treated fabric undisturbed for 3 minutes, after which the melting and penetration of the fabric is visually observed. The number corresponding to the mixture containing the highest percentage of heptane which does not penetrate or wet the fabric is considered to be the oil repellency rating of the treated fabric. The results are summarized in Table II.

TABLE II.—OIL REPELLENCY OF TREATED CLOTH

| Compound | Concentration of solution | Oil repellency |
|---|---|---|
| $(CF_3)_2CFO(CF_2)_4CH_2CH_2—N^+\langle\rangle$ I⁻ | 1 | 70 |

We claim:

1. A compound of the formula

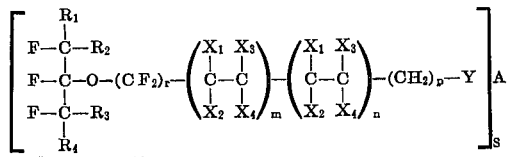

wherein a. $R_1$–$R_4$ can be independently selected from the group consisting of fluorine, chlorine and perhaloalkyl groups of one to 10 carbon atoms, or when taken together $R_1$–$R_4$ may form a perhalocycloalkyl structure, the halo portions of $R_1$–$R_4$ being fluorine or chlorine, with the provisos that each carbon atom of $R_1$–$R_4$ contain at least one fluorine atom, no more than three of $R_1$–$R_4$ are haloalkyl groups, $R_1$ and $R_2$ cannot both be chlorine and $R_3$ and $R_4$ cannot both be chlorine;

b. $X_1$–$X_4$ independently can be hydrogen, fluorine, chlorine or bromine, provided that each $X_1$–$X_4$ group do not include more than two chlorine atoms or one bromine atom, and when $X_1$ and $X_3$ independently are each hydrogen or fluorine, each of $X_2$ and $X_4$ independently may be $CF_2R_5$ wherein $R_5$ is a radical selected from the group consisting of fluorine, chlorine alkyl of one to eight carbon atoms, or haloalkyl of one to eight carbon atoms in which the halogen atoms are fluorine, chlorine or bromine, the $(X_1X_2C—CX_3X_4)_m$ and $(X_1X_2C—CX_3X_4)_n$ moieties may be the same or different;

c. Y is a nitrogen-containing radical selected from the group consisting of pyridine, alkyl substituted pyridine and hydroxyalkyl substituted pyridine, connected through their N atoms to the terminal C atom of the TABLE I.—SURFACE TENSIONS OF AQUEOUS SOLUTIONS OF THE SUBJECT EMULSIFIERS at 25°

| Compound | Concentration, percent | Surface tension, dynes/cm. | Remarks |
|---|---|---|---|
| $(CF_3)_2CFO(CF_2)_4CH_2CH_2—N^+\langle\rangle$ I⁻ | .50 | 14.9 | Solution was cloudy. |
|  | .10 | 24.7 | Solution was clear. |
|  | .05 | 32.5 | Do. |
| $(CF_3)_2CFO(CF_2)_2CH_2CH_2—N^+\langle\rangle$ I⁻ | 1.0 | 20.5 | Solution was clear. |
|  | .50 | 29.9 | Do. |
|  | .10 | 50.7 | Do. |
|  | .05 | 57.9 | Do. |
| $(CF_3)_2CFO(CF_2)_2CH_2CH_2—S—C(NH_2)(=NH^+)$ I⁻ | 1.0 | 16.2 | Solution was clear. |
|  | .50 | 23.8 | Do. |
|  | .10 | 36.0 | Do. |
|  | .05 | 40.1 | Do. | polyfluoroisoalkoxyalkyl radical, said alkyl and hydroxyalkyl substituents containing from one to three carbon atoms;

d. A is an accompanying anionic moiety;

e. $r$ is an integer from 1–2, $m$ and $n$ are integers from 0–20, the sum of $m$ and $n$ is 0–20, $p$ is an integer from 0–1, with the proviso that when $p$ is 0, $n$ must be at least 1 and $X_3$ and $X_4$ in the $(X_1X_2C-CX_3X_4)_n$ moiety must be hydrogen and $s$ is an integer from one up to the total negative charge of A.

2. A compound according to claim 1 wherein $m$ and $n$ are integers from 0–10.

3. A compound according to claim 2 wherein $X_1$–$X_4$ are hydrogen, fluorine or chlorine.

4. A compound according to claim 3 wherein the $-(X_1X_2C-CX_3X_4)-$ moieties are independently selected from the group consisting of $-CF_2-CF_2-$, $-CF_2-CH_2-$, $-CF_2-CClF-$, and $-CH_2CH_2-$.

5. A compound according to claim 4 wherein $R_1$–$R_4$ independently are fluorine or perfluoroalkyl groups of one to three carbon atoms.

6. A compound according to claim 5 wherein A is an anion selected from the group consisting of halide, sulfate, phosphate, alkyl sulfonate of one to six carbon atoms and aryl sulfonate of six to nine carbon atoms.

7. A compound according to claim 6 wherein A is a halide anion.

8. A compound according to claim 7 wherein A is an iodide anion or bromide anion.

9. A compound according to claim 6 wherein Y is a radical selected from the group consisting of pyridine and picoline.

10. A compound according to claim 1 of the formula

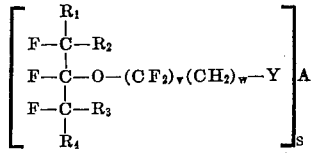

11. A compound according to claim 10 wherein $R_1$–$R_4$ independently are fluorine or perfluoroalkyl groups of one to three carbon atoms.

12. A compound according to claim 11 wherein A is an anion selected from the group consisting of halide, sulfate, phosphate, alkyl sulfonate of one to six carbon atoms and aryl sulfonate of six to nine carbon atoms.

13. A compound according to claim 12 wherein $v$ and $w$ are integers from 1–12.

14. A compound according to claim 13 wherein Y is a radical selected from the group consisting of pyridine and picoline.

15. A compound according to claim 14 wherein Y is pyridine.

16. A compound according to claim 13 wherein $R_1$–$R_4$ are fluorine.

17. A compound according to claim 16 wherein A is a halide anion.

18. A compound according to claim 17 wherein A is an iodide anion.

19. A compound according to claim 16 wherein Y is pyridine.

20. A compound according to claim 16 wherein Y is picoline.

21. A compound according to claim 19 of the formula

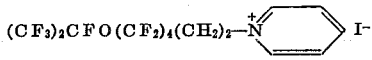

22. A compound according to claim 19 of the formula.

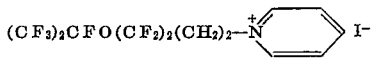

* * * * *